UNITED STATES PATENT OFFICE.

JOSEPH TURNER, OF HUDDERSFIELD, ENGLAND.

AMIDOSULFONIC ACID.

SPECIFICATION forming part of Letters Patent No. 655,529, dated August 7, 1900.

Application filed September 2, 1899. Serial No. 729,373. (No specimens.)

*To all whom it may concern:*

Be it known that I, JOSEPH TURNER, of Huddersfield, in the county of York, England, have invented certain new and useful Improvements in the Manufacture of Amidosulfonic Acids Derived from Nitro Compounds of Phenol, Salicylic or Benzoic Acid, of which the following is a full, clear, and exact description.

I have found that certain nitro bodies of the phenolic and carboxylic series yield useful amido sulfonic acids when boiled with several times their weight of bisulfite of soda until a sample taken shows no free nitro body. The following substances may be enumerated as being especially useful for the purpose of this invention:

1. Para nitro phenol.
2. Ortho nitro phenol.
3. Ortho nitro salicylic acid.
4. Para nitro salicylic acid.
5. Meta nitro benzoic acid.

The following example will serve to illustrate the nature of my invention: One hundred parts, by weight, of ortho or para nitro salicylic acid or the products obtained by the nitrations of salicylic acid are boiled with one thousand parts, by weight, of bisulfite of soda until the yellow color of the nitro compound has disappeared. Hydrochloric acid is then added and the solution boiled until free from sulfurous acid. On allowing the mixture to cool the amido sulfo salicylic acid separates out in the form of a white crystalline precipitate.

The amido sulfo acids of Nos. 1, 3, 4, and 5 precipitate from an acid solution. No. 2 is easily soluble in an acid solution. Free acid from meta nitro benzoic acid and ortho nitro phenol are readily soluble in water, free acid from para nitro phenol and ortho and para salicylic acid only moderately soluble in water. Amido sulfo salicylic acids and amido sulfo benzoic acids give a red-brown coloration with a trace of chromic acid. Amido phenol sulfonic acids give a violet coloration with a trace of chromic acid. They all possess the valuable properties of diazotizing and combining with phenols, &c. They are all slightly soluble in alcohol and practically insoluble in benzin. All the sodium salts are very soluble in water. They all form crystallized diazo compounds with nitrous acid.

I will now describe the following modifications of the above process:

Example 1: 23.1 parts amido sulfo salicylic acid are diazotized in the usual manner and the diazo compound run into a solution containing eighteen parts of alpha naphtylamin hydrochlorid. After standing for some time the intermediate product is filtered off and the precipitated amido azo compound after dissolving in soda is further diazotized by the addition of seven parts of sodium nitrite and thirty-seven parts of hydrochloric acid of thirty per cent. The diazotizing is complete in a few hours and is then run into a solution of thirty-five parts of beta naphtol disulfonic acid R in carbonate of soda. After standing a few hours the coloring-matter separates in the form of a fine black precipitate and may be filtered, pressed, and dried. The dyestuff so obtained is easily soluble in water to a violet-black solution and dyes animal fibers a bluish black from an acid-bath. By subsequent treatment with chromium salts the dyed fabrics change to deep blacks which possess the valuable characteristics of fastness to light and milling.

Example 2: 18.9 ortho amido phenol sulfonic acid are diazotized and run into a solution containing eighteen parts of alpha naphtylamin hydrochlorid. When the formation of the intermediate body is completed, it is filtered off, and after dissolving in soda is further diazotized by the addition of seven parts of sodium nitrite and thirty-seven parts of hydrochloric acid of thirty per cent. After a short time the diazo azo compound is completely formed and is combined with thirty-five parts of beta naphtol disulfonic acid R dissolved in carbonate of soda. The dyestuff may be isolated by filtering, pressing, and drying. It is easily soluble in water and dyes wool from an acid-bath dark-violet shades, which become deeper by treatment with bichromate of potash. The shades so obtained possess considerable fastness to light and milling.

Example 3: 23.1 amido sulfo salicylic acid are diazotized in the usual manner and run into a solution of 12.2 parts of meta toluylene diamin. The coloring-matter separates out and may be filtered, pressed, and dried. The dyestuff is moderately soluble in water and dyes wool a yellowish brown, which by treatment with chromium salts becomes a deep reddish brown.

Properties of the coloring-matter herein referred to are, first, readily soluble in water; second, dyes animal fibers from an acid-bath, and, third, forms lakes with metallic salts.

Instead of beta naphtol disulfonic R in Examples 1 and 2, as last component, I may use alpha naphtol para sulfonic acid 1:4, or amido naphtol disulfonic acid 1:8:3:6 with beneficial results.

I claim—

The amido sulfo acids as herein set forth, the said acids being derived from nitro bodies of the phenolic and carboxylic series by the action of bisulfite of soda, and possessing the property of diazotizing and combining with phenols, the said acids being slightly soluble in alcohol, practically insoluble in benzin, forming crystallized diazo compounds with nitrous acid, and all the sodium salts, being very soluble in water.

JOSEPH TURNER.

Witnesses:
HERBERT MELLOR,
JOHN WM. BREAVLEY.